United States Patent

Walker et al.

[15] 3,680,662
[45] Aug. 1, 1972

[54] LIQUID SHOCK ABSORBING BUFFER

[72] Inventors: Grant W. Walker, Sacramento; Duane B. Ford, Placerville, both of Calif.

[73] Assignee: John Rich Enterprises, Inc., Dover, Del.

[22] Filed: June 22, 1970

[21] Appl. No.: 48,950

Related U.S. Application Data

[63] Continuation of Ser. No. 777,329, Nov. 20, 1968, abandoned.

[52] U.S. Cl. ........................188/1 B, 9/8, 61/48, 104/254, 104/256, 114/219, 188/266, 188/298, 256/1, 256/13.1, 267/116, 267/139, 293/1, 293/60, 293/64
[51] Int. Cl. ............E02b 3/22, F16f 5/00, F16f 9/08
[58] Field of Search ....61/46, 48; 104/249, 254, 256; 114/219; 188/1 B, 1 C, 32, 129, 266, 298; 256/1, 13.1; 267/116, 139; 293/1, 70, 71 R, 71 P, 60, 64; 9/8

[56] References Cited

UNITED STATES PATENTS

| 2,722,906 | 11/1955 | Tweddell | 61/48 X |
|---|---|---|---|
| 3,503,600 | 3/1970 | Rich | 293/1 X |
| 2,088,087 | 7/1937 | Hudson | 256/1 |
| 1,623,888 | 4/1927 | Pasini | 114/219 |
| 3,141,655 | 7/1964 | Platt | 188/32 |
| 3,284,122 | 11/1966 | Rich | 293/1 |

FOREIGN PATENTS OR APPLICATIONS

| 18,213 | 9/1912 | Great Britain | 188/1 C |

*Primary Examiner*—Arthur L. La Point
*Assistant Examiner*—Howard Beltran
*Attorney*—Kimmel, Crowell & Weaver

[57] ABSTRACT

A buffer construction for protecting fixed structures from collision by automobiles and the like is disclosed. The construction comprises a backing plate which is a part of, or associated with, the fixed structure, at least two laterally spaced apart clusters of buffer members, a movable vertical rigid diaphragm spaced from the backing member by the two clusters of buffer members and an additional cluster of buffer members in front of the movable diaphragm. Several movable diaphragms may be used, each pair separated by one or more clusters of buffer members. An anchor cable and a cable for repositioning the diaphragms is also disclosed.

22 Claims, 4 Drawing Figures

INVENTORS.
GRANT W. WALKER
DUANE B. FORD
BY KIMMEL, CROWELL
& WEAVER
ATTORNEYS.

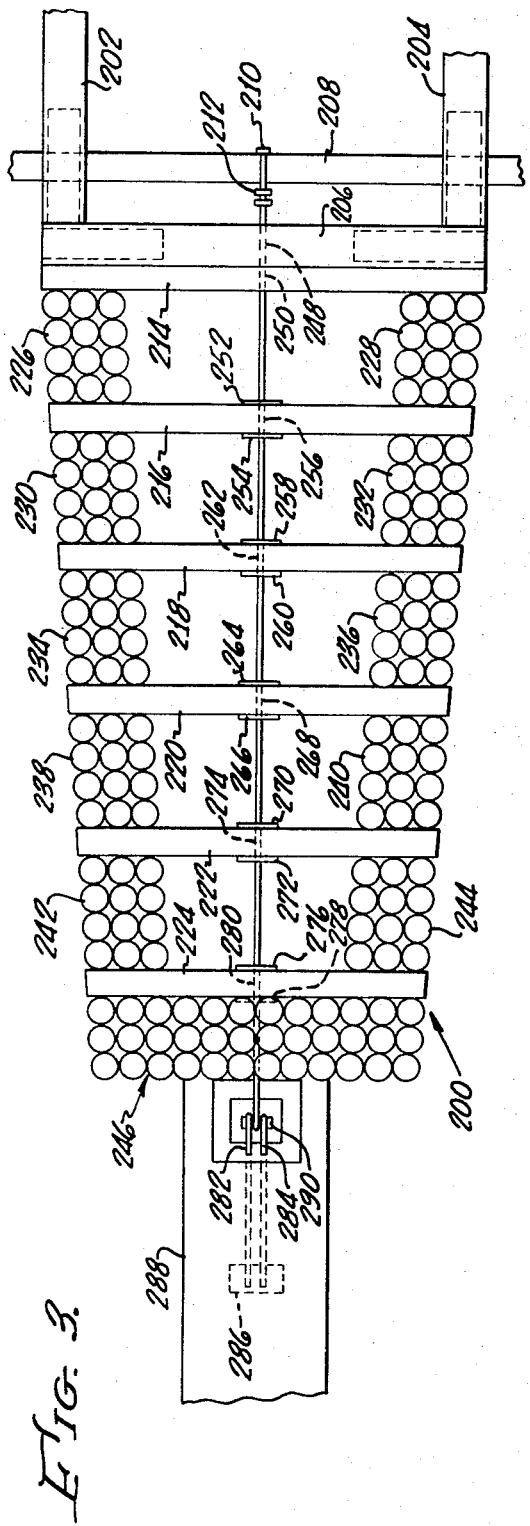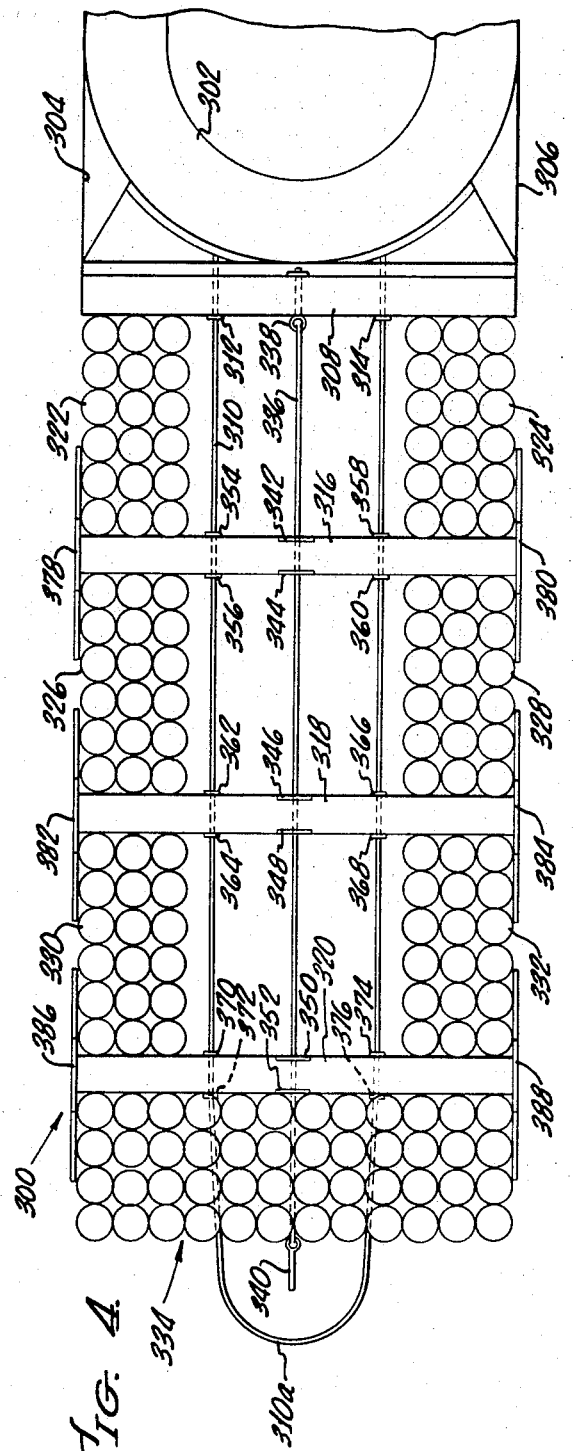

LIQUID SHOCK ABSORBING BUFFER

CROSS-REFERENCE TO RELATED APPLICATION

The present application is a continuation of application Ser. No. 777,329 filed Nov. 20, 1968, now abandoned.

BACKGROUND OF THE INVENTION

1. Field of the Invention

This invention relates to constructions for protecting fixed structures from collision by vehicles and the like. More particularly, this invention relates to energy absorbing stationary devices for absorbing the energy of collision of a vehicle with a fixed structure such as a bridge supporting column, parapet, or the like.

2. Description of the Prior Art

It is conventional practice to put guard rails and the like alongside highways, roads, streets, and vehicular traffic routes generally to prevent cars, trucks, buses, and other vehicles from colliding with abutments, bridge supporting columns, parapets, and other fixed structures which may be positioned adjacent or near such vehicular traffic routes. Conventional practice is to put a railing between the vehicular traffic route and the fixed structure to deflect the automobile in such a manner that the automobile, or other vehicle, avoids direct collision with the fixed structure. Such devices are of only limited value since the vehicle may be thrown back into the vehicular traffic route and collide with other vehicles or it may be thrown against other fixed structures.

The utilization of devices for absorbing or dissipating the kinetic energy of a traveling vehicle has been suggested. For example, buffer members and constructions utilizing buffer members are described in the patent application of John W. Rich, Ser. No. 644,333, filed Aug. 30, 1967 now U.S. Pat. No. 3,503,600. The individual buffer members described in said application are utilized in the construction of this invention and the entire disclosure and the references cited in the above mentioned application of John W. Rich are hereby incorporated in this Specification by reference.

SUMMARY OF THE INVENTION

It has now been found that the effectiveness of the energy absorbing buffer members of the aforementioned application of John W. Rich can be greatly enhanced by providing the novel structures illustrated in the drawings described hereinafter. In particular, it has been discovered that if a movable rigid diaphragm is positioned in spaced apart relation with respect to the structure to be protected and if one or more clusters of energy absorbing buffer members are positioned between the structure to be protected and the movable diaphragm and if an additional cluster of buffer members is positioned in front of the movable diaphragm, the impact energy of a vehicle traveling toward the structure to be protected may be more effectively absorbed and dissipated. Accordingly, it is a principal object of this invention to provide a novel construction for protecting fixed structures which includes a movable diaphragm spaced from the structure by a cluster of energy absorbing buffer members.

It has further been discovered that even greater enhancement of effectiveness can be achieved if two or more laterally spaced apart clusters of buffer members are positioned between the movable diaphragm and the structure to be protected and that the overall cost of such constructions can thereby be reduced. It is, therefore, an important object of this invention to provide a novel energy absorbing and dissipating construction which includes at least one movable diaphragm separated from a structure to be protected by at least two clusters of energy absorbing buffer members.

It has further been discovered that still greater enhancement of effectiveness may be achieved by using a plurality of serially arranged movable diaphragms each separated by one or more, and preferably two or more, clusters of energy absorbing buffer members. Therefore, an object of this invention is to provide a construction which comprises a plurality of movable diaphragms spaced apart by at least one cluster of energy absorbing buffer members.

An additional object of the invention is to provide means for repositioning the movable diaphragms following impact.

The novel constructions illustrated in the drawings and described hereinafter constitute more specific objects of the invention, but the invention is not deemed to be limited to the exact constructions illustrated.

Other objects and advantages of the invention will appear from the Specification which follows and from the drawings to which reference is now made.

BRIEF DESCRIPTION OF THE DRAWING

FIG. 3 is an alternative embodiment of the invention shown in a top plan view.

FIG. 4 is yet another alternative embodiment of the invention, also shown in top plan view.

DESCRIPTION OF THE PREFERRED EMBODIMENTS

Figure 1:
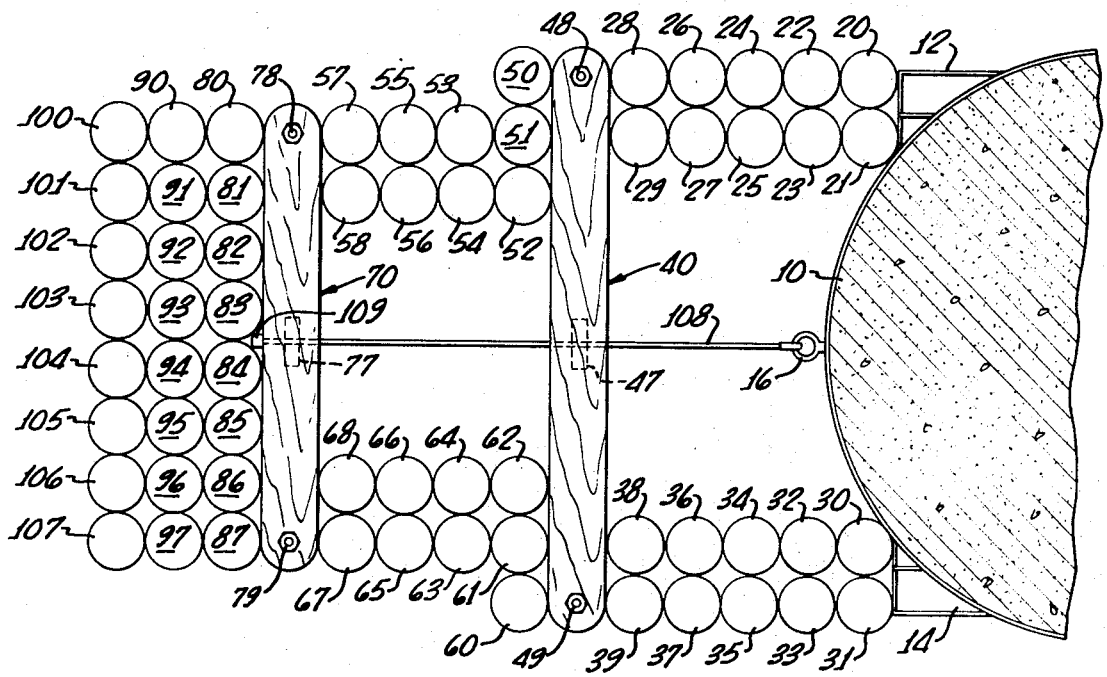
FIG. 1 is a top plan view of the construction of this invention shown in an exemplary embodiment associated with a typical concrete parapet construction.
Figure 2:
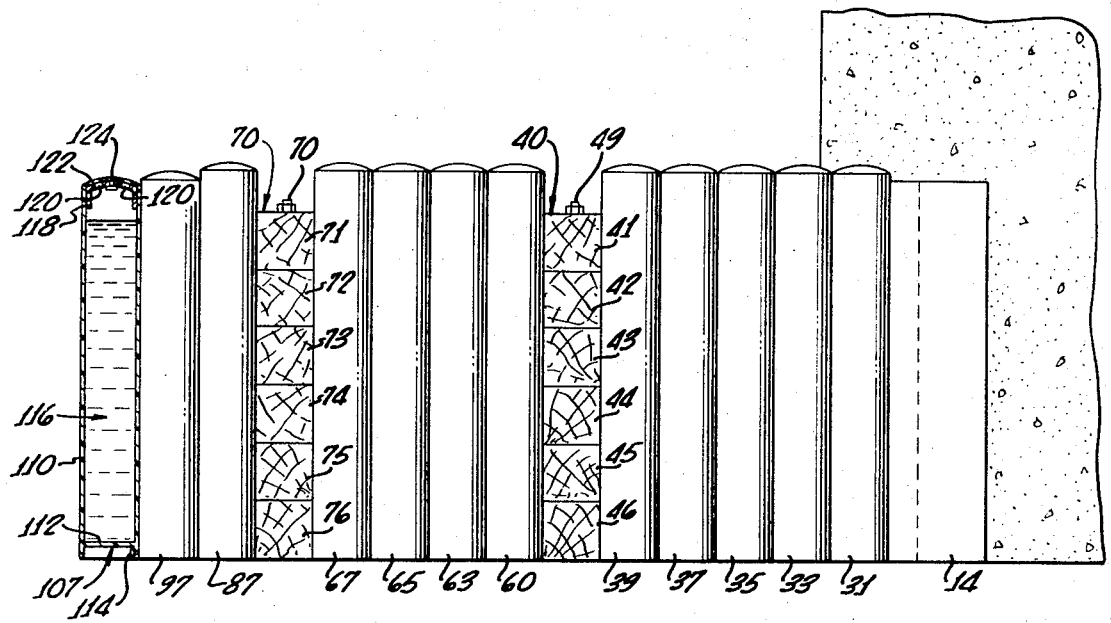
FIG. 2 is a side elevation view of the invention of FIG. 1 showing one of the buffer members in cross section.

Reference is made to FIGS. 1 and 2 for an exemplary embodiment of the invention.

A fixed structure such as a parapet 10 which is normally located adjacent or proximate a vehicular route of travel such as a street or a highway is sought to be protected. This protection, of course, encompasses the main object of the invention; i.e., the protection of the vehicles and the occupants thereof from injury upon collision of a vehicle with such a fixed construction, such as the parapet 10.

The parapet may be provided with a backing member which comprises two portions, 12 and 14, which are fixed and are preferably adjacent to the fixed construction. An eye-bolt 16 is desirably provided in connection with the backing member or the fixed construction for purposes to be described in greater detail hereinafter. Positioned in front of the backing means which comprises members 12 and 14 are a first cluster of buffer members of the type described in the aforementioned application of John W. Rich indicated by numerals 20–29 and by a second similar cluster of such buffer members 30–39 shown in laterally spaced relation therefrom.

On the side of the clusters opposite the backing member there is positioned a movable, generally vertical diaphragm means 40. The diaphragm means 40 may include, as best shown in FIG. 2, a plurality of relatively vertically positioned logs or timbers 41–46. One of the members is apertured and provided with a guide, as shown as 47 in FIG. 1, and the timbers, or equivalent, are secured together by bolts 48 and 49.

In the referred embodiment, another set of laterally spaced clusters shown, respectively, by numerals 50–58 and by numerals 60–68 are in front of the diaphragm means 40.

In a similar manner, another movable diaphragm means 70 of similar construction which may include timbers 71–76, one of which is apertured and includes a guide 77 and which are secured together by bolt 78 and 79 is linearly spaced in front of the diaphragm means 40. An additional cluster of energy absorbing buffers indicated respectively at 80–87, 90–97, and 100–107 is positioned in front of the diaphragm means 70.

A cable 108 is secured at one end to the eye-bolt and extends through the apertures in the diaphragms 40 and 70 and is secured by means of a keeper 109 on the distal end of the cable.

Reference is made to the buffer member shown in cross section in FIG. 2. Each of the buffer members may typically comprises a cylindrical member 110 having a bottom 112 which may be secured by one or more bolts 114 to adjacent buffer members. The cylinder is normally partially or wholly filled with a non-compressible fluid 116 which is preferably water. However, any fluent material which is essentially non-compressible may be used. An important feature of the cylinder construction is a closure cap 118 which includes one or more apertures 120. These apertures are constructed and disposed and are of a size such that the energy of impact of a vehicle or the collapsing energy causes the fluid to flow, by turbulent viscous flow, through the orifices or apertures 120 at a rate only commensurate with the degree of energy causing the cylinder to collapse, i.e., the impact energy.

A cap 122 secured by a bolt 124 and being downwardly concave fits over the dome-shaped cap top 118 to prevent evaporation and contamination of the fluid 116.

OPERATION

It will be apparent that since the diaphragm members are spaced from and in front of the backing member and the diaphragm member 40 is separated from the backing member by two clusters of the energy absorbing buffer members and the two diaphragm members are separated by two clusters of the energy absorbing buffer members and because of the additional cluster of buffer members shown in front of the diaphragm 70, a vehicle traveling toward the fixed structure would not normally strike the structure at all. Instead, the vehicle would strike the additional cluster of buffer members, e.g. buffer members 100–107, imparting the impact energy thereto. The impact energy would be transferred to the first movable diaphragm 70, from there to the clusters 50–58 and 60–68 to the second diaphragm 40, and thence to the buffer member clusters 20–29 and 30–39. The energy of impact is dissipated as the walls of the buffer members are collapsed initially by the impact of the vehicle on the additional cluster of buffer members and by the movement of the respective diaphragms collapsing the clusters of buffer members positioned there between and between the diaphragm and the backing plate which comprises elements 12 and 14.

It has been found that a fewer number of buffer members may be used in association with the movable diaphragms to achieve efficient and satisfactory energy absorption. In fact, it has been found that energy absorption is considerably more efficient using the movable diaphragm construction just described than using a much larger number of buffer members without a diaphragm construction. The function of the diaphragm is to more effectively distribute the impact energy to a larger number of the buffer members. It is postulated that each of the buffer members acts, individually, more efficiently than most of the buffer members would if no diaphragms were provided to distribute the impact energy.

It will be noted that the diaphragm 70 is narrower, as illustrated in FIG. 1, than is the diaphragm 40. In this particular configuration, a stepped effect is provided.

An alternative construction is shown at 200 in FIG. 3 in which the diaphragms and the buffer members form a generally frusto-conical configuration.

In this embodiment, a medium barrier which comprises side elements 202 and 204 and a front element 206 may be located adjacent a route of vehicular traffic. It is desired to protect vehicles from direct collision with this fixed structure. The structure includes a cross member or strong back 208 around which a cable 210 is secured to clamps 212. Backing plate means 214 are provided and, linearly spaced therefrom, are a series of movable diaphragms 216, 218, 220, 222, and 224. The diaphragm 216 is separated from the backing plate 214 by a pair of buffer member clusters 226 and 228. In like manner, buffer member clusters 230 and 232 separate diaphragms 216 and 218, clusters 234 and 236 separate diaphragm means 218 and 220, clusters 238 and 240 separate diaphragms 220 and 222, and clusters 242 and 244 separate diaphragms 222 and 224.

An additional cluster of buffer members 246 is disposed in front of the diaphragm 224. The cable 210 extends through an aperture 248 in the barrier and an aperture 250 in the backing plate 214. The cable 210 also extends through steel guide plates 252 and 254 and aperture 256 in diaphragm 216. In like manner, the cable extends through the plates 258 and 260 and the aperture 262 in diaphragm 218, the plates 264 and 266 and the aperture in diaphragm 220, the plates 270 and 272 and the aperture 274 in diaphragm 222, and through the plates 276 and 278 and the aperture 280 in diaphragm 224. The distal end of the cable 210 is secured to anchor means which comprise a pair of steel anchor elements 282 and 284 secured together by an anchor plate 286 embedded in a concrete block 288. A pin or bolt 290 may be utilized to secure the cable to the anchor means. In respect to the anchor means, especially, it is to be understood that this is merely an exemplary embodiment and that any anchor means, for example a simple eye-bolt—dead man arrangement, would be sufficient.

The operation of the construction of this embodiment is substantially the same as that previously discussed. In this embodiment, as in the other embodiments, the diaphragms may be made of a plurality of timbers simply bolted together as previously described or of timbers bolted together in spaced relation, the spacing being provided by means of blocks, etc. The essential feature of the diaphragm is that it be substantially rigid; i.e., rigid enough to distribute the impact energy to the clusters of energy absorbing cylinders between the respective diaphragms and between the last diaphragm and the backing member.

It is to be noted that the frusto-conical configuration of the construction 200, shown in FIG. 3, is achieved by making each of the diaphragms shorter than the next succeeding diaphragm toward the backing member and by arranging the buffer members to conform to the diminishing width.

An additional alternative embodiment is shown in FIG. 4. This construction 300, may be used in conjunction with a parapet 302 which may be provided with a pair of backing elements 304 and 306 to which is secured a backing plate 308 by means of a cable 310 secured to the elements 304 and 306 and to the backing plate 308 by means of keepers 312 and 314. Diaphragms 316, 318, and 320 are provided in linear spaced apart disposition. A pair of buffer member clusters 322 and 324 separate the diaphragm 316 from the backing plate 308, a pair of buffer member clusters 326 and 328 separate the diaphragms 316 and 318 and in like manner the diaphragms 318 and 320 are separated by clusters 330 and 332. An additional cluster 334 is provided in front of the diaphragm 320.

A cable 336 is secured at one end to an eye-bolt 338 through the backing plate 308 and extends, in a manner analogous to that previously described with respect to construction 200, through guide plates 342 and 344 in diaphragm 316, guide plates 346 and 348 in diaphragm 318, and through guide plates 350 and 352 in diaphragm 320. The cable 336 is anchored at its distal end to an eye-bolt 340 which is secured to a dead-man, not shown.

An important feature of this invention is the use of keepers 354 and 356 on one side and 358 and 360 on the other side of the diaphragm 316 to fix the diaphragm on the cable 310. The diaphragm 318 is similarly fixed on the cable by means of keepers 362 and 364 and keepers 366 and 368 on the respective side. In a similar manner, keepers 370 and 372 on one side and keepers 374 and 376 on the other side fix the diaphragm 320 on the cable 310. Means 310A are provided in front of the forward most diaphragm 320 for being secured to a vehicle.

Following impact, the diaphragms and the buffer members would be displaced. Since the diaphragms and buffer members are relatively heavy, it is not easy for one or two men to replace these elements to their proper disposition. Therefore, a vehicle, such as a car, pick-up, truck, tractor or the like, may simply hook on to the loop 310A and stretch the cable 310. Since the cable extends through two sides of the diaphragms and the diaphragms are fixed on the cable, the mere stretching of the cable repositions the diaphragms. Since the buffer members are bolted together, as indicated in FIG. 2 and described in greater detail in the aforementioned application of John W. Rich, most, if not all, of the buffer members will also be returned to their proper configuration.

Ornamental architectural plates 378 and 380, on diaphagram 316, 382, and 384 on diaphragm 318 and 386 and 388 on diaphragm 320 may be provided to form an attractive, as well as useful, construction.

The operation of the aforementioned embodiment of the invention will, obviously, be analogous to that described previously with respect to FIGS. 1, 2, and 3.

The embodiments disclosed are exemplary of the types of configurations which may be used with ordinary fixed structures which are conventionally placed alongside streets. The most common type of such structures are the pillars and the like which support bridges and overpasses and the like. However, any type of fixed abutment or construction may be guarded from collision by the safety constructions just described. It will be apparent, to the skilled engineer, that the configuration of the diaphragms and the buffer member clusters will to some degree be dictated by the configuration of the construction with which it is to be associated. Such adaptations of configurations are well within the skill of the art and are within the spirit and scope of the invention as defined in the following claims.

We claim:

1. A diaphragm buffer protective construction which comprises: substantially rigid normally generally vertical backing plate means adapted to be secured adjacent a fixed structure, said fixed structure normally being positioned near a vehicular traffic route or the like:

at least one substantially rigid diaphragm means, said diaphragm means normally being generally vertical and being normally spaced in front of said backing plate means;

at least one cluster of collapsible, normally incompressible fluid filled buffer members of generally cylindrical configuration, said buffer members having at least one orifice positioned and constructed to permit discharge of said fluid therethrough only at a rate commensurate with a collapsing force applied thereto, said cluster comprising a plurality of said buffer members positioned between said diaphragm means and said backing plate means in a series of adjacent rows, said diaphragm means being movable toward said backing plate means for contacting said buffer members of the first of said series of adjacent rows; and at least one additional cluster of said buffer members in front of said diaphragm means;

said backing plate means, diaphragm means and said clusters being so disposed and constructed that a vehicle traveling toward said fixed structure would normally strike the additional cluster of buffer members exerting impact force thereon and therefrom to the diaphragm means and thence in succession to the buffer members of said series of adjacent rows such that the impact energy is dissipated by successive collapse of said buffer members and discharge of said fluid through said orifices in the several buffer members at a rate commensurate with the energy of impact.

2. The construction of claim 1 wherein at least two laterally spaced apart clusters of buffer members are positioned between the backing plate means and the diaphragm means.

3. The construction of claim 2 further comprising a plurality of spaced apart diaphragm means each separated from the other by at least one cluster of buffer members.

4. The construction of claim 1 further comprising first flexible elongate means secured to the backing plate means and associated with the diaphragm means for limiting relative movement of the diaphragm means from the backing plate means.

5. The construction of claim 4 further comprising means anchoring the distal end of the flexible elongate means at a position in front of the forward most diaphragm means.

6. The construction of claim 5 wherein the diaphragm means are movable along said first flexible elongate means.

7. The construction of claim 6 further comprising second flexible elongate means fixedly secured with respect to the backing plate means and, at intervals therealong, to the diaphragm members and having means extending in front of the forwardmost diaphragm member for being secured to a vehicle, said flexible elongate means being so constructed, secured and disposed that when the means in front for being secured to a vehicle is pulled away from the backing plate means, the diaphragm means will be moved into a generally linear array in front of said backing plate means.

8. The construction of claim 7 wherein said diaphragm means is comprised of a plurality of individual elongated members interconnected to one another.

9. The construction of claim 7 further comprising a plurality of spaced apart diaphragm means with at least one cluster of buffer members between predetermined adjacent pairs of said diaphragm means and there being a void space in the region intermediate at least one adjacent pair of said diaphragm means.

10. The construction of claim 9 wherein at least two laterally spaced apart clusters of buffer members are positioned between the backing plate means and the diaphragm means and between adjacent diaphragm means.

11. A construction for protecting fixed structures positioned near vehicular traffic routes and for protecting traveling vehicles from damage by collision with said structures, comprising:
a backing plate associated with and rigidly fixed adjacent said structure;
at least two clusters of buffer members spaced from each other positioned in front of said backing plate toward the vehicular traffic route each cluster being arranged in a series of contiguous rows;
at least one movable substantially rigid diaphragm spaced from the backing plate, said diaphragm being adjacent the side of the clusters opposite the backing plate and substantially contiguous the forwardmost row of each cluster; and
an additional cluster of buffer members in front of the diaphragm member, each of said clusters comprising at least one vertical collapsible cylinder normally filled with a non-compressible fluid and having at least one orifice disposed and constructed for discharge of the fluid therefrom only at a rate commensurate with collapsing energy applied thereto, said backing member, two spaced clusters; movable diaphragm and additional cluster being so disposed and constructed that a vehicle traveling toward said structure would normally strike the additional cluster transmitting impact energy thereto and therethrough to the diaphragm and thence in succession to the rows of each spaced cluster thereby collapsing said buffer members and dissipating the impact energy by discharge of said fluid at a rate commensurate with the impact energy.

12. The construction of claim 11 further comprising means interconnecting the diaphragm and the backing plate for repositioning the diaphragm, following impact, when said repositioning means is stretched.

13. The construction of claim 12 further comprising a series of movable diaphragms in relatively spaced disposition in front of the backing plate separated from each other by additional sets of laterally spaced clusters of buffer members.

14. The construction of of claim 11 further comprising side wall members attached to each end of said diaphragm means for retaining said clusters of buffer members intermediate adjacent pairs of said moveable diaphragms.

15. The construction of claim 14 wherein each succeeding diaphragm is laterally narrower than the diaphragm next in line toward the backing plate and said diaphragms and clusters are positioned to form a generally frusto-conical configuration.

16. The construction of claim 11 wherein the movable diaphragms are constructed of polymer bonded fiberglass on wood.

17. A diaphragm buffer protective construction which comprises: substantially rigid normally generally vertical backing plate means adapted to be secured adjacent a fixed structure, said fixed structure normally being positioned near a vehicular traffic route or the like;
at least one substantially rigid diaphragm means, said diaphragm means normally being generally vertical and being normally spaced in front of said backing plate means;
at least one cluster of collapsible buffer members, each buffer member constructed to collapse at a rate commensurate with an impact force applied thereto, the buffer members of said one cluster being positioned in a serial and substantially contiguous array between said diaphragm means and said backing plate means; and
at least one additional cluster of said buffer members in front of said diaphragm means;
said backing plate means, diaphragm means and said clusters being so disposed and constructed that a vehicle traveling toward said fixed structure would normally strike the additional cluster of buffer members exerting an impact force thereon through successive serially aligned members of said additional cluster and therefrom to the diaphragm means and thence in succession through the serial and contiguous array of said buffer members of said one cluster such that the impact energy is dissipated by collapse of said buffer members at a rate commensurate with the energy of impact.

18. The construction of claim 17 further comprising a plurality of movable diaphragms in relatively spaced disposition in front of the backing plate separated from each other by additional sets of laterally spaced clusters of buffer members.

19. The construction of claim 18 further comprising flexible elongate means secured to the backing plate means and associated with the diaphragm means for limiting relative movement of the diaphragm means from the backing plate means.

20. The construction of claim 19 further comprising means anchoring the distal end of the flexible elongate means at a position spaced from the backing plate means.

21. The construction of claim 20 and further including side plates connected to opposite ends of said diaphragm means.

22. The construction of claim 18 wherein each succeeding diaphragm is laterally narrower than the diaphragm next in line toward the backing plate and said diaphragms and clusters are positioned to form a generally frusto-conical configuration.

* * * * *